United States Patent [19]

Sato et al.

[11] Patent Number: 4,938,199
[45] Date of Patent: Jul. 3, 1990

[54] METHOD FOR CONTROLLING THE AIR-FUEL RATIO IN VEHICLE INTERNAL COMBUSTION ENGINES

[75] Inventors: Toshio Sato; Yoshiharu Abe; Yuji Fujiki; Hiroshi Hasebe, all of Wako, Japan

[73] Assignee: Honda Giken Kogyo Kabushiki Kaisha, Tokyo, Japan

[21] Appl. No.: 238,425

[22] Filed: Aug. 31, 1988

[30] Foreign Application Priority Data

Aug. 31, 1987 [JP] Japan ................................ 62-217328
Aug. 31, 1987 [JP] Japan ................................ 62-217329

[51] Int. Cl.$^5$ ............................................ F02M 23/08
[52] U.S. Cl. ...................................... 123/585; 123/327
[58] Field of Search ............... 123/585, 586, 587, 588, 123/589, 327

[56] References Cited

U.S. PATENT DOCUMENTS

| | | | |
|---|---|---|---|
| 4,532,900 | 8/1985 | Hibino et al. | 123/587 |
| 4,553,521 | 11/1985 | Kishida et al. | 123/587 |
| 4,700,679 | 10/1987 | Otobe et al. | 123/585 |
| 4,799,466 | 1/1989 | Shibata et al. | 123/327 |

Primary Examiner—Willis R. Wolfe
Assistant Examiner—M. Macy
Attorney, Agent, or Firm—Pollock, Vande Sande & Priddy

[57] ABSTRACT

A method for controlling the air-fuel ratio in internal combustion engines, in which a low and/or decelerating engine speed is detected according to a change speed of engine operation parameters and the degree of opening of a flow regulating valve is controlled according to such change speed when deceleration is detected.

2 Claims, 6 Drawing Sheets

FIG. 4b

METHOD FOR CONTROLLING THE AIR-FUEL RATIO IN VEHICLE INTERNAL COMBUSTION ENGINES

FIELD OF THE INVENTION

The present invention relates to an air-fuel ratio control method for an on-vehicle internal combustion engine.

BACKGROUND OF THE INVENTION

In a known air-fuel ratio control device, as disclosed in U.S. Pat. No. 4,088,100, for example, an exhaust gas component concentration such as an oxygen concentration in an exhaust gas is detected by an exhaust gas component concentration sensor, and an air quantity or a fuel quantity in a fuel mixture to be supplied to an internal combustion engine mounted in a vehicle is regulated according to a detection value by the exhaust gas component concentration sensor to thereby feedback control an air-fuel ratio of the supplied fuel mixture, for the purposes of purification of the exhaust gas and improvement in fuel consumption.

Generally, just after starting deceleration of the internal combustion engine, an intake manifold vacuum is rapidly increased by the closure of a throttle valve. As a result, fuel deposited on an inner wall surface of the intake manifold is vaporized to render the air-fuel ratio of the fuel mixture to be supplied overrich, causing an increased emission of unburnt harmful components such as HC (hydrocarbon). To prevent such overenrichment of the air-fuel ratio, a known method is provided to supply a so-called shot air (deceleration secondary air) into the intake manifold upon closing of the throttle valve.

However, when rapid opening and closing of the throttle valve is repeated at a low vehicle speed of about 20 km/h, for example, a large amount of the shot air is supplied to the engine, causing an overlean state of the air-fuel ratio. Particularly, at low vehicle speeds, a fluctuation in engine torque with respect to a load fluctuation is rendered large because of a reduced weight of the fuel mixture. As a result, there is a possibility of engine stall due to the overlean air-fuel ratio.

SUMMARY OF THE INVENTION

Accordingly, it is an object of the present invention to provide an air-fuel ratio control method which prevents engine stall due to supply of the shot air at a low vehicle speed, particularly in an on-vehicle combustion engine having an automatic transmission.

According to the present invention, there is provided in an air-fuel ratio control method for an on-vehicle internal combustion engine having an automatic transmission, a secondary intake air supplying passage communicating with an intake pipe downstream of a throttle valve in a carburetor of said internal combustion engine and a flow regulating valve provided in said secondary intake air supplying passage, the improvement comprising the steps of detecting a low vehicle speed, detecting an in-gear condition of the automatic transmission, detecting a decelerating condition of said internal combustion engine according to a change speed of engine operation parameters, detecting an engaged condition of a clutch in a power transmitting system of said engine, controlling an opening degree of said flow regulation valve according to said change speed upon detection of said decelerating condition so far as low vehicle speed and said in-gear condition are not detected, and stopping the control of the opening angle of said flow regulation valve when the engaged condition of said clutch continues for a predetermined time.

DESCRIPTION OF THE DRAWINGS

In order that the invention may by more clearly understood, reference will now be made to the accompanying drawings wherein an embodiment of the invention is shown for purposes of illustration, and wherein.

DESCRIPTION OF PREFERRED EMBODIMENT

Figure 1:
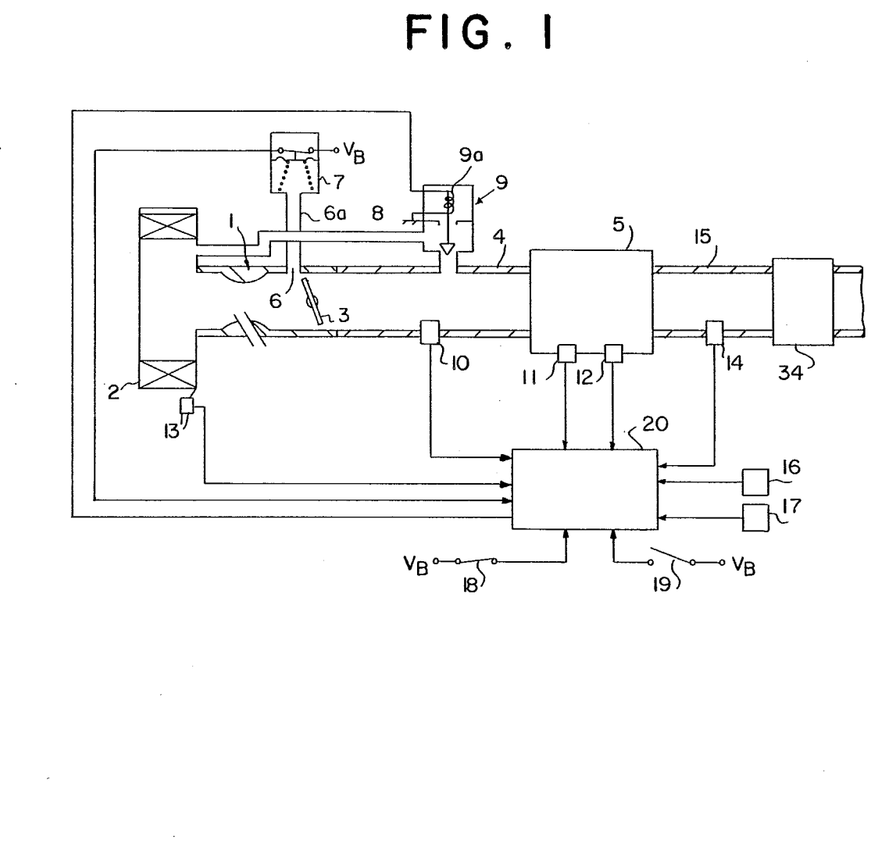
FIG. 1 is a schematic illustration of the air-fuel ratio control device to which the air-fuel ratio control method of the present invention is applied.

FIG. 1 shows an air-fuel ratio control device to which the air-fuel ratio control method of the present invention is applied. The air-fuel ratio control device is provided with a secondary intake air supply passage 8 communicated from the vicinity of an air discharge opening of an air cleaner 2 to an intake manifold 4 downstream of throttle valve 3 in a carburetor 1. The secondary intake air supplying passage 8 is provided with a proportional type solenoid valve 9 serving as a flow regulation valve. The degree of opening of solenoid valve 9 is changed in proportion to a current value to be supplied to a solenoid 9a in the solenoid valve 9.

A vacuum detecting port 6 is formed on the inner wall surface of an intake passage in the vicinity of the throttle valve 3. When the opening angle of the throttle valve 3 is not greater than a predetermined angle, the vacuum detecting port 6 is located upstream of the throttle valve 3, but when the opening angle of the throttle valve 3 is greater than the predetermined angle, the vacuum detecting port 6 is located downstream of the throttle valve 3. A vacuum $P_C$ at the vacuum detecting port 6 is supplied through a vacuum passage 6a to a vacuum switch 7, which detects a closed condition of the throttle valve 3. When the vacuum at the vacuum detecting port 6 is not greater than 30 mm/Hg, for example, the vacuum switch 7 is designed to go on.

An absolute pressure sensor 10 is provided in the intake manifold 4 to generate an output at a level according to an absolute pressure $P_{BA}$. A crank angle sensor 11 is provided to generate a pulse, e.g., a TDC pulse, synchronous with the rotation of a crank shaft (not shown) of an engine 5. A cooling water temperature sensor 12 is provided to generate an output at a level according to a cooling water temperature $T_W$. An intake air temperature sensor 13 is provided to generate an output voltage according to an intake air temperature $T_A$. An oxygen concentration sensor 14 serving as an exhaust gas component concentration sensor is provided in an exhaust manifold 15 of the engine 5 to generate an output voltage according to the oxygen concentration in the exhaust gas. For example, the oxygen concentration sensor 14 is a sensor of $\lambda=1$ type designed to suddenly change an output voltage at a theoretical air-fuel ratio. A catalytic converter 34 is provided downstream of the oxygen concentration sensor 14 in the exhaust manifold 15 to promote a reduction in harmful components in the exhaust gas. Each output from the vacuum switch 7, the absolute pressure sensor 10, the crank angle sensor 11, the water temperature sensor 12, the intake air temperature sensor 13 and the oxygen concentration sensor 14 is applied to a control circuit 20. The control circuit 20 is further connected to a vehicle speed sensor 16 for generating an output at a level according to a vehicle speed V, and an atmospheric pressure sensor 17 for generating an output according to an atmospheric pressure $P_A$. In the case of MT (manual transmission) vehicles, the control circuit 20 is connected to a clutch switch 18 adapted to go off when a clutch pedal (not shown) is depressed. In the case of AT (automatic transmission) vehicles, the control circuit 20 is connected to a neutral switch 19 adapted to go on when a range select lever of an automatic transmission (not shown) is positioned in a neutral range. Although either the clutch switch 18 or the neutral switch 19 is actually provided, both switches are shown in the drawing for purposes of illustration. The vacuum switch 7, the clutch switch 18 and the neutral switch 19 are adapted to generate a low level output when they are off, and a high level output when they are on.

Figure 2:
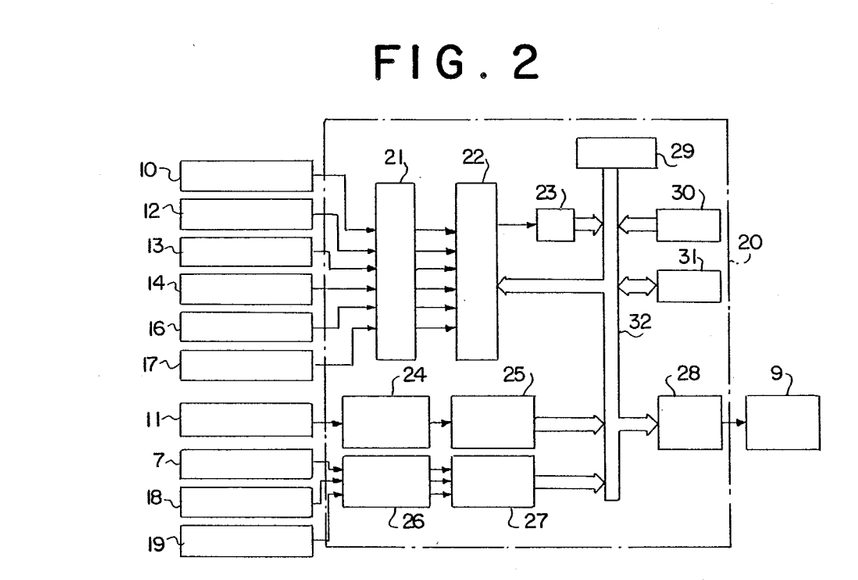
FIG. 2 is a block diagram of the control circuit in the device shown in FIG. 1.

As shown in FIG. 2, the control circuit 20 includes a level converting circuit 21 for converting a level of each output from the absolute pressure sensor 10, the water temperature sensor 12, the intake air temperature sensor 13, the oxygen concentration sensor 14, the vehicle speed sensor 16 and the atmospheric pressure sensor 17; a multiplexer 22 for selectively generating one of the sensor outputs received through the level converting circuit 21; an A/D converter 23 for converting an output signal from the multiplexer 22 to a digital signal; a waveform of the output signal from the crank angle sensor 11; a counter 25 for measuring a pulse separation of output pulses from the waveform shaping circuit 24 by the number of clock pulses generated from a clock pulse generating circuit (not shown) and outputting data of an engine speed $N_e$; a level converting circuit 26 for converting a level of each output from the vacuum clutch 7, the clutch switch 18 and the neutral switch 19; a digital input modulator 27 for making the converted outputs from the level converting circuit 26 into digital data; a driving circuit 28 for driving to open the solenoid valve 9; a CPU (central processing circuit) 29 for conducting a digital operation according to a program; a ROM 30 for preliminarily storing various processing programs and data; and a RAM 31. The solenoid 9a of the solenoid valve 9 is connected in series with a driving transistor and a current detecting resistor (both not shown) in the driving circuit 28, and a power voltage is supplied between both ends of such a series circuit. The multiplexer 22, the A/D converter 23, the counter 25, the digital input modulator 27, the driving circuit 28, the CPU 29, the ROM 30 and the RAM 31 are connected to one another through an I/O bus 32. The CPU 29 incorporates timers A, B and C (all not shown), and the RAM 312 is a non-volatile memory.

Each information of the absolute pressure $P_{BA}$ in the intake manifold 4, the cooling water temperature $T_W$, the intake air temperature $T_A$, the oxygen concentration $O_2$ in the exhaust gas, the vehicle speed V and the atmospheric pressure $P_A$ is alternatively supplied from the A/D converter 32 through the I/O bus 32 to the CPU 29, and the information indicative of the engine speed $N_e$ is supplied through the I/O bus 32 to the CPU 29. Further, the information of on-off state of the vacuum switch 7, the clutch switch 18 and the neutral switch 19 is supplied from the digital input modulator 27 through the I/O bus 32 to the CPU 29. When an ignition switch (not shown) is turned on, the CPU 29 repeats to sequentially process an air-fuel ratio F/B (feedback) routine and a deceleration secondary air supply routine according to a clock pulse, thereby calculating or setting as a data an air-fuel ratio control output value $AF_{OUT}$ indicative of a current value to be supplied to the solenoid 9a of the solenoid valve 9, and then supplying the output value $AF_{OUT}$ to the driving circuit 28. The driving circuit 28 operates to closed-loop control the current value flowing through the solenoid 9a so that the current value may become the output value $AF_{OUT}$.

Figure 3:
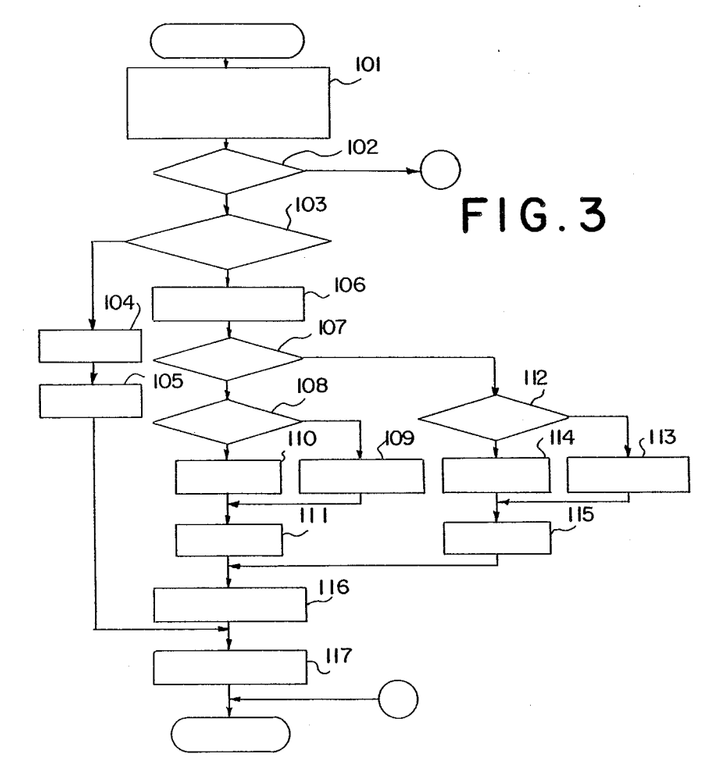
FIGS. 3, 4a and 4b are flow charts of the operation of the CPU.
Figure 4A:
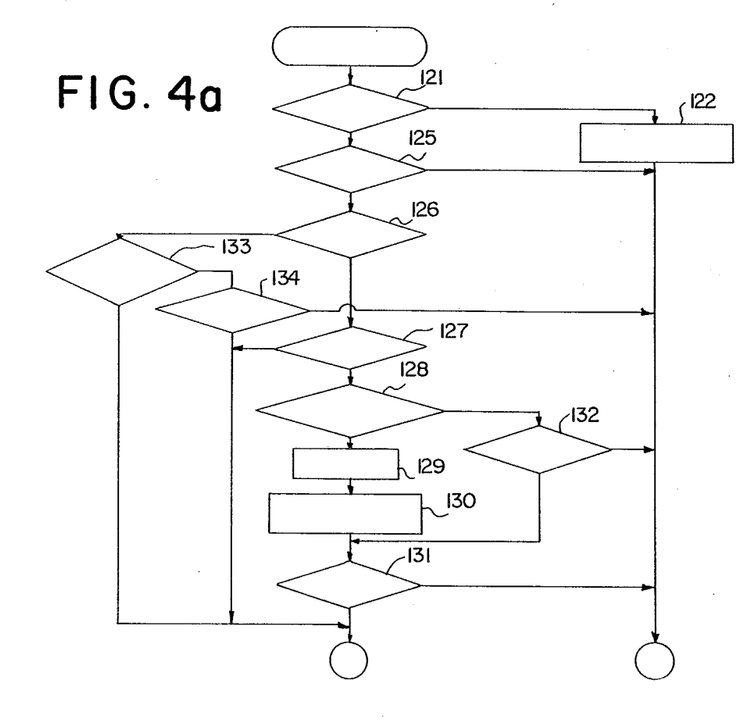
Figure 4B:
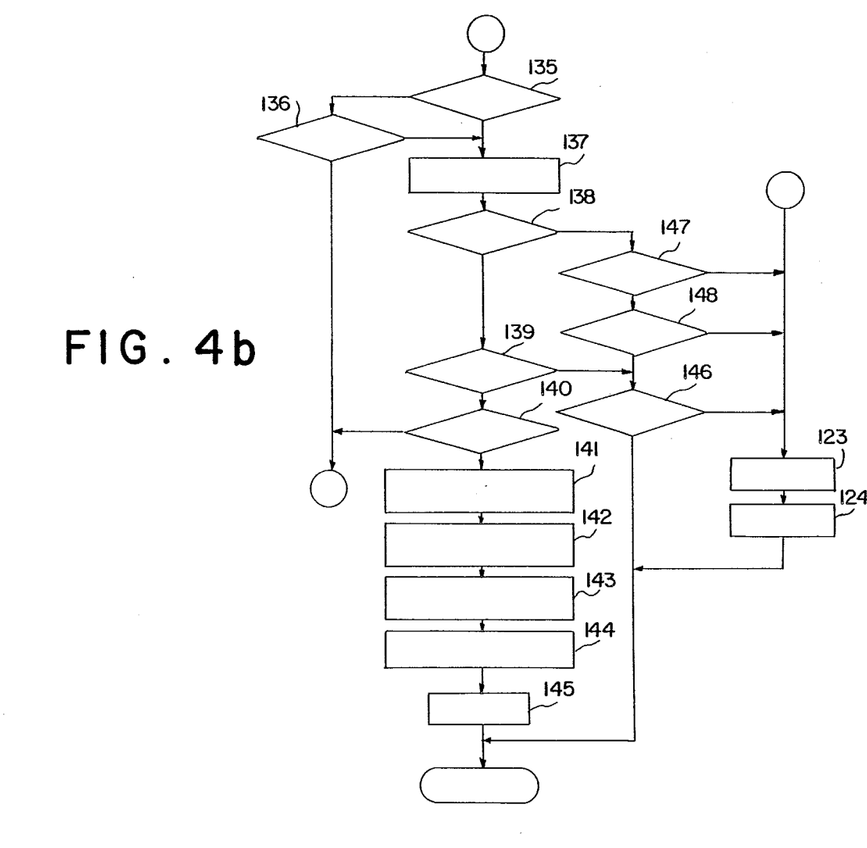

The operation of the air-fuel ratio control device as mentioned above will now be described in detail with reference to FIGS. 3 and 4 showing a flow chart of the operation of the CPU 29.

In the air-fuel ratio F/B routine shown in FIG. 3, the CPU 29 reads each information of the absolute pressure $P_{BA}$, the cooling water temperature $T_W$, the intake air temperature $T_A$, the oxygen concentration $O_2$ in the exhaust gas, the vehicle speed V, the atmospheric pressure $P_A$, the engine speed $N_E$, and the on-off state of the vacuum switch 7, the clutch switch 18 and the neutral switch 19 (step 101). It is then determined whether or not a deceleration secondary air supply flag $F_{SA}$ is equal to 1 (step 102). If $F_{SA}=1$, it is determined that the secondary intake air is being supplied into the intake manifold 4 at engine deceleration, and that air-fuel ratio feedback control conditions are not satisfied. Accordingly, the present routine is ended. If $F_{SA}=0$, it is determined that no secondary intake air is being supplied at engine deceleration. It is then determined whether or not the other air-fuel ratio feedback conditions have been satisfied according to each information as read (step 103). For example, at high engine speed, at high intake air temperature, at low intake air temperature or the like, it is determined that the air-fuel ratio feedback control conditions are not satisfied, and the air-fuel ratio control output value $AF_{OUT}$ is set to 0 so as to open-loop control the air-fuel ratio (step 104). Further, an air-fuel ratio correction value $I_{OUT}$ is set to 0 (step 105). On the other hand, when the air-fuel ratio feedback control conditions are satisfied, an air-fuel ratio control reference value $D_{BASE}$ is retrieved (step 106). As the ROM 30 preliminary stored the reference value $D_{BASE}$ to be defined from the absolute pressure $P_{BA}$ and the engine speed $N_e$ as a $D_{BASE}$ data map, the CPU 29 retrieves the reference value $D_{BASE}$ corresponding to the absolute pressure $P_{BA}$ and the engine speed $N_e$ as read from the $D_{BASE}$ data map. In the $D_{BASE}$ data map, the reference value $D_{BASE}$ between grids is calculated by interpolation.

After setting the reference value $D_{BASE}$, it is determined whether or not an output voltage $V_{O2}$ of the oxygen concentration sensor 14 is greater than a reference voltage $V_{ref}$ (0.5 V, for example) (step 107). If $V_{O2}>V_{ref}$, it is determined that the air-fuel ratio of a supplied fuel mixture is richer than a theoretical air-fuel ratio, and it is then determined whether or not a flag $F_P$ is equal to 1 (step 108). If $F_P=1$, it is determined that the air-fuel ratio has been just inverted from a lean state to a rich state with respect to the theoretical air-fuel ratio. Therefore, a proportional quantity $P_R$ $(=\alpha_R \times N_e \times P_{BA}; \alpha_R$ is a constant) is added to the air-fuel ratio correction value $I_{OUT}$, and the calculated value is set to a new air-fuel ratio correction value $I_{OUT}$ (step 109). If $F_P=0$, it is determined that the air-fuel ratio continues to be a rich state. Therefore, an integral quantity $I (=K \times N_e \times P_{BA}$; K is a constant) is added to the air-fuel ratio correction value $I_{OUT}$, and the calculated value is set to a new air-fuel ratio correction value $I_{OUT}$ (step 110). After executing the step 109 or 110, the flag $F_P$ is reset to 0 so as to indicate that the air-fuel ratio has been in a rich state in this processing cycle (step 111).

On the other hand, if $V_{O2} \leq V_{ref}$, it is determined that the air-fuel ratio of the supplied fuel mixture is in a lean state, and it is then determined whether or not the flag $F_P$ is equal to 0 (step 112). If $F_P=0$, it is determined that the air-fuel ratio has been just inverted from the rich state to the lean state with respect to the theoretical air-fuel ratio. Therefore, a proportional quantity $P_L(=a_L \times N_e \times P_{BA}; a_L$ is a constant; $a_R=a_L$) is subtracted from the air-fuel ratio correction value $I_{OUT}$, and the calculated value is set to a new air-fuel ratio correction value $I_{OUT}$ (step 113). If $F_P=1$, it is determined that the air-fuel ratio continues to be a lean state. Therefore, the integral quantity I is subtracted from the air-fuel ratio correction value $I_{OUT}$, and the calculated value is set to a new air-fuel ratio correction value $I_{OUT}$ (step 114). After executing the step 113 or 114, the flag $F_P$ is reset to 1 so as to indicate that the air-fuel ratio has been in a lean state in this processing cycle (step 115). After executing the step 111 or 115, the calculated air-fuel ratio correction value $I_{OUT}$ is added to the air-fuel ratio control reference value $D_{BASE}$ to thereby calculate the air-fuel ratio control output value $AF_{OUT}$ (step 116). Then, the calculated output value $AF_{OUT}$ is output to the driving circuit 28 (step 117). Accordingly, the driving circuit 28 detects the current value flowing through the solenoid 9a of the solenoid valve 9 by a current value with the control output value $AF_{OUT}$. Then, according to the result of comparison, the driving circuit 28 operates to turn on and off a driving transistor to thereby supply current to the solenoid 9a. Thus, the solenoid 9a is supplied with current corresponding to the output value $AF_{OUT}$ to obtain an opening degree of the solenoid valve proportional to the current value flowing through the solenoid 9a. That is, the secondary intake air in an amount corresponding to the control output value $AF_{OUT}$ is supplied into the intake manifold 4. Further, in the case of open-loop control, the output value $AF_{OUT}$ is set to 0. Therefore, so far as $F_{SA}=1$ is not effective, the solenoid valve 9 is closed to stop the supply of the secondary intake air.

In the deceleration secondary air supply routine as shown in FIGS. 4(a) and 4(b), it is first determined whether or not the engine speed $N_e$ is greater than a cranking determination speed $N_{el}$ (400 rpm, for example) (step 121). If $N_e \leq N_{el}$, it is determined that the engine has not yet started. Therefore, a predetermined time $t_A$ (5 sec, for example) is set in the timer A to start down-counting (step 122), and a clutch operation determination flag $F_{CR}$ and the deceleration secondary air supply flag $F_{SA}$ are reset to 0 (steps 123 and 124). If $N_e > N_{el}$, it is determined that the engine has started, and it is then determined whether or not a count value $T_{CR}$ of the timer A has reached 0 (step 125). If $T_{CR}>0$, it is determined that the engine has just started, and the program therefore proceeds to step 123. If $T_{CR}=0$, it is determined that the predetermined time $t_A$ or more has elapsed after starting of the engine. In this case, it is determined whether or not the vehicle is an AT vehicle (step 126). For example, a MT/AT determination switch (not shown) provided on a circuit board of the control circuit 20 is set in manufacturing the vehicle in such a manner that a logic "1" output signal is supplied to the CPU 29 in the case of an AT vehicle, while a logic "0" output signal is supplied to the CPU 29 in the case of an MT vehicle. Thus, according to the logic output, whether the vehicle is an AT vehicle or a MT vehicle can be determined. In the case of the MT vehicle, it is determined whether or not the vehicle speed V is smaller than an vehicle running determination speed $V_1$ (2 miles/h, for example) (step 127). If $V \geq V_1$, it is determined whether or not the clutch switch 18 is on (step 128). If the clutch switch 18 is off, it is determined that the clutch pedal has been depressed to release the clutch. Therefore, the flag $F_{CR}$ is set to 1 (step 129), and a time $t_{CHG}$ (2.0 sec, for example) is set in the timer B to start down-counting (step 130). Then, it is determined whether or not a count value $T_{CHG}$ of the timer B has reached 0 (step 131). If the clutch switch 18 is on, it is determined that the clutch is in the engaged condition, and it is then determined whether or not the flag $F_{CR}$ is equal to 1 (step 132). If $F_{CR}=1$, it has not been determined that the time $t_{CHG}$ had elapsed from a timing when the clutch released condition has been changed into the engaged condition. Therefore, the program proceeds to step 131, and it is determined whether or not $T_{CHG}=0$ is effective. If $F_{CR}=0$, it is determined that the clutch engaged condition continues for the time $t_{CHG}$ or more, and the deceleration secondary air supply is not carried out. Therefore, the program proceeds to step 123. If $T_{CHG}0$ in step 131, it is determined that the $t_{CHG}$ had not elapsed from a timing when the clutch has been engaged. Therefore, if the other deceleration secondary air supply conditions are satisfied, it is decided that the deceleration secondary air should be supplied, and the program therefore proceeds to step 135.

If it is determined in step 126 that the vehicle is an AT vehicle, it is then determined whether or not the neutral switch 19 is on (step 133). If the neutral switch 19 is on, it is determined that the range select lever of the automatic transmission is positioned in the neutral range, that is, the automatic transmission is not in an in-gear condition. Therefore, the program proceeds to step 135. If the neutral switch 19 is off, it is determined that the range select lever is positioned in any ranges other than the neutral range, that is, the automatic transmission is in the in-gear condition. Then it is determined whether or not the vehicle speed V is greater than a slow running determination speed $V_2$ (12.5 miles/h, for example) (step 134). If $V>V_2$, it is determined that the vehicle speed is not a low speed, and therefore the program proceeds to step 135. If $V \leq V_2$, it is determined that the vehicle has stopped, or is running at a low vehicle speed. Then, as the deceleration secondary air supply is not required, the program proceeds to step 123. Further, if $V<V_1$ in step 127, the program proceeds directly to step 135.

Figure 5:
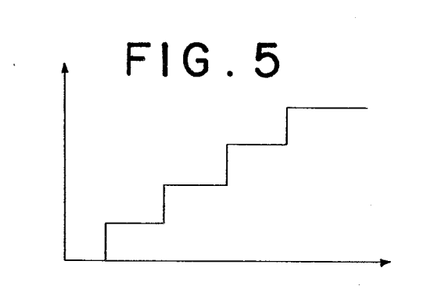
FIG. 5 is a graph of the $\Delta P_b$–$t_{SA}$ characteristic.
Figure 6:
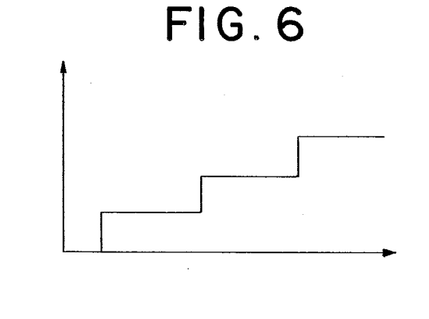
FIG. 6 is a graph of the $\Delta P_B$–$AF_{OUT}$ characteristic.

In step 135, it is determined whether or not the cooling water temperature $T_W$ is greater than an engine warm-up determination temperature $T_{W1}$ (80 C., for example). If $T_W \leq T_{W1}$, it is then determined whether or not the vehicle speed V is greater than the slow running determination speed $V_2$ (step 136). If $V \leq V_2$, it is determined that the engine has not yet been warmed up, and the vehicle has stopped or is running at a low vehicle speed. In this case, steps 123 and 124 are executed, thus ending the present processing of the routine. If $T_W > T_{W1}$ in step 135, it is determined that the engine warm-up has been completed. Further, if $T_W \leq T_{W1}$ and $V > V_2$, it is determined that the vehicle speed is not a low vehicle speed. In both cases, a pressure differential between a vacuum $P_{Bn-1}$ in the intake manifold 4 in the previous processing cycle and a vacuum $P_{Bn}$ in the intake manifold 4 in the present processing cycle is calculated as a pressure change $\Delta P_B$ per unit of time (step 137). It is then determined whether or not the pressure change $\Delta P_B$ is equal to or more than 0 (step 138). If $\Delta P_B \geq 0$, it is determined that the engine is decelerating. Therefore, it is then determined whether or not the flag $F_{SA}$ is equal to 1 (step 139). If $F_{SA} = 0$, it is determined that the deceleration has just started. Therefore, it is then determined whether or not the pressure change $\Delta P_B$ is smaller than a predetermined value $\Delta P_{BSA1}$ (150 mmHg, for example) (step 140). If $\Delta P_B < \Delta P_{BSA1}$, it is determined that the engine decelerating condition is not a condition such that the secondary intake air supply is required. Accordingly, steps 123 and 124 are executed to end, the present processing in the routine. On the other hand, if $\Delta P_B \geq \Delta P_{BSA1}$, a deceleration secondary air supply time $t_{SA}$ and an air-fuel ratio control output value $AF_{OUT}$ according to the pressure change $\Delta P_B$ are retrieved from a $t_{SA}$ date map and an $AF_{OUT}$ data map both stored in the ROM 30 (steps 141 and 142). The ROM 30 previously stores the $t_{SA}$ data map having a $\Delta P_B - t_{SA}$ characteristic as shown in FIG. 5 and the $AF_{OUT}$ data map having a $\Delta P_B - AF_{OUT}$ characteristic as shown in FIG. 6. Therefore, the CPU 29 retrieves the time $t_{SA}$ according to the pressure change $\Delta P_B$ from the $t_{SA}$ data map, and also retrieves the air-fuel ratio control output value $AF_{OUT}$ according to the pressure change $\Delta P_B$ from the $AF_{OUT}$ data map.

After retrieving the time $t_{SA}$ and the air-fuel ratio control output value $AF_{OUT}$, the time $t_{SA}$ is set in the timer C to start down-counting (step 143). Then, the air-fuel ratio control output value $AF_{OUT}$ retrieved is output to the driving circuit 28 (step 144), and the flag $F_{SA}$ is set to 1 so as to indicate the deceleration secondary air supply (step 145). Thus, the solenoid 9a of the solenoid valve 9 is supplied with current corresponding to the output value $AF_{OUT}$ by the driving circuit 28 to obtain an opening degree of the solenoid valve 9 proportional to the current value flowing through the solenoid 9a. That is, the secondary intake air in an amount corresponding to the control value $AF_{OUT}$ is supplied into the intake manifold 4 at deceleration of the engine.

If $F_{SA} = 1$ in step 139, it is determined that the deceleration secondary air is being supplied. Therefore, it is determined whether or not a count value $T_{SA}$ of the timer C has reached 0 (step 146). If $T_{SA} > 0$, the deceleration secondary air continues to be supplied. If $T_{SA} = 0$, it is determined that the time $t_{SA}$ or more has elapsed after detecting a decelerating condition. Therefore, the program proceeds to steps 123 and 124 so as to stop the deceleration secondary air supply. As $F_{SA} = 0$ is set in step 124, a new air-fuel ratio control output value $AF_{OUT}$ is set by the next processing of the air-fuel ratio F/B routine, and the opening degree of the solenoid valve 9 is varied according to the new output value $AF_{OUT}$ to thereby end the deceleration secondary air supply.

If $\Delta P_B < 0$ in step 138, it is determined that the engine is accelerating. Therefore, it is determined whether or not an absolute value of the pressure change $\Delta P_B$ is greater than an absolute value of a predetermined value $\Delta P_{BX}$ (step 147). If $|\Delta P_B| > |\Delta P_{BX}|$, it is determined that the acceleration is rapid and that the deceleration secondary air supply is not required. Therefore, the program proceeds to step 123. If $|\Delta P_B| \leq |\Delta P_{BX}|$, it is determined that the acceleration is relatively gentle. Therefore, it is then determined whether or not the flag $F_{SA}$ is equal to 1 (step 148). If $F_{SA} = 1$, it is determined that the deceleration secondary air is being supplied. Then, the program proceeds to step 146 so as to continue to supply the deceleration secondary air. If $F_{SA} = 0$, the steps 123 and 124 are executed to end the present processing of the routine.

Consequently, in the case of MT vehicles, when $T_W > T_{W1}$ is satisfied, or $T_W \leq T_{W1}$ and $V > V_2$ are satisfied under the condition where $V \geq V_1$ is satisfied and the clutch is released to conduct gear change or the like, and the decelerating condition of $\Delta P_B > \Delta P_{BSA1}$ is detected, and so far as $|\Delta P_B| > |\Delta P_{BX}|$ is not satisfied after the detection of the decelerating condition, the opening degree of the solenoid valve 9 is controlled according to the pressure change $\Delta P_B$ upon detection of the decelerating condition for the time $t_{SA}$ according to the pressure change $\Delta P_B$ upon detection of the decelerating condition, thus supplying the deceleration secondary air into the intake manifold 4. Further, when the clutch is engaged during supplying of the deceleration secondary air, the deceleration secondary air is supplied for a period of time from the clutch engaged timing to a timing when the time $t_{CHG}$ is elapsed so far as $|\Delta P_B| > |\Delta P_{BX}|$ is not satisfied.

On the other hand, in the case of AT vehicles, when $T_W > T_{W1}$ is satisfied, or $T_W < T_{W1}$ and $V > V_2$ are satisfied under the neutral condition, and the decelerating condition of $\Delta P_B > \Delta P_{BSA1}$ is detected, and so far $|\Delta P_B| > |\Delta P_{BX}|$ is not satisfied 496 after the detection of the decelerating condition, the opening degree of the solenoid valve 9 is controlled according to the pressure change $\Delta P_B$ upon detection of the decelerating condition for the time $t_{SA}$, thus supplying the deceleration secondary air into the intake manifold 4. Further, when the automatic transmission is in the in-gear condition, and $V > V_2$ is satisfied, and the decelerating condition of $\Delta P_B \geq \Delta P_{BSA1}$ is detected, the deceleration secondary air is supplied in the same manner as under the neutral condition as mentioned above. However, when the low-speed running condition of $V \leq V_2$ is detected under the in-gear condition, the supply of the deceleration secondary air is immediately stopped.

Although the above preferred embodiment employs a change speed of the intake manifold vacuum as an engine operation parameter in detecting a decelerating condition, the engine operation parameter is not limited to the change speed of the intake manifold vacuum, but it may include a change speed of a throttle valve opening angle, intake air quantity or engine speed.

Although the flow regulating valve in the above-mentioned embodiment is of a proportional type, a closing type flow regulating valve may be used to conduct a duty-ratio control of the opening and closing operation.

By means of the air-fuel ratio control method of the present invention, the supply of shot air is stopped when the engaged condition of the clutch continues for a predetermined time, or when the engine is brought into a decelerating condition by rapid opening and closing of the throttle valve when the automatic transmission is in the in-gear position at low vehicle speed. Accordingly, it is possible to prevent that the air-fuel ratio is rendered lean because of the supply of shot air upon great fluctuation in engine load, and hence, a reduction in engine speed, thus avoiding engine stall.

We claim:

1. In an air-fuel ratio control method for an on-vehicle internal combustion engine having an automatic transmission, a secondary intake air supplying passage communicating with an intake pipe downstream of a throttle valve in a carburetor of said internal combustion engine, and a flow regulating pipe provided in said secondary intake air supplying passage, the improvement comprising the steps of:

(a) detecting a low vehicle speed;

(b) detecting an in-gear condition of said automatic transmission;

(c) detecting a decelerating condition of said engine in accordance with a change of speed of engine operation parameters; and (d) controlling an opening degree of said flow regulating valve in accordance with said change of speed upon detection of said decelerating condition when it is determined that said low vehicle speed is not detected and at the same time said in-gear condition is not detected.

2. The improvement according to claim 1, wherein said flow regulating valve comprises a proportional type flow regulating valve whose degree of opening is varied in accordance with a current value to be supplied thereto, comprising the further steps of:

(e) setting the current magnitude and a time period for supplying said current magnitude in accordance with said change of speed; and (f) supplying said current value to said flow regulating valve during said time period.

* * * * *